United States Patent
Joul et al.

(10) Patent No.: US 10,425,849 B1
(45) Date of Patent: Sep. 24, 2019

(54) VISUALIZATION OF PERSONALIZED QUALITY OF EXPERIENCE REGARDING MOBILE NETWORK

(71) Applicant: T-Mobile USA, Inc., Bellevue, WA (US)

(72) Inventors: Christopher Harvey Joul, Bellevue, WA (US); Kevin Lau, Issaquah, WA (US); Warren J. McNeel, Issaquah, WA (US); Jie Hui, Mercer Island, WA (US); Cristian Asandului, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/950,040

(22) Filed: Apr. 10, 2018

(51) Int. Cl.
    *H04B 17/00* (2015.01)
    *H04W 24/08* (2009.01)
    *H04W 4/02* (2018.01)
    *H04L 12/26* (2006.01)

(52) U.S. Cl.
    CPC .......... *H04W 24/08* (2013.01); *H04L 43/045* (2013.01); *H04W 4/02* (2013.01)

(58) Field of Classification Search
    CPC ........ H04W 24/08; H04W 4/02; H04L 43/045
    USPC ...................................................... 455/67.7
    See application file for complete search history.

(56) References Cited

U.S. PATENT DOCUMENTS

| | | | | |
|---|---|---|---|---|
| 8,385,221 | B2 * | 2/2013 | Chetlur | H04L 41/5067 370/252 |
| 8,964,595 | B2 * | 2/2015 | Agarwal | H04W 24/08 370/252 |
| 9,143,976 | B2 * | 9/2015 | Raleigh | H04L 41/0893 |
| 9,179,359 | B2 * | 11/2015 | Raleigh | H04L 41/0893 |
| 2014/0100919 | A1 * | 4/2014 | Taff | G06Q 30/0203 705/7.32 |
| 2016/0174081 | A1 * | 6/2016 | Lau | H04W 24/02 455/457 |

\* cited by examiner

*Primary Examiner* — Sonny Trinh
(74) *Attorney, Agent, or Firm* — Knobbe, Martens, Olson & Bear, LLP

(57) ABSTRACT

A QoE (quality of experience) system utilizes QoS (quality of service) of a mobile network and specification of user device connected for providing a personalized metric (QoE) that represents an expected level of user experience at a geographic location. The personalized metric can be calculated based on the QoS of the mobile network at the geographic location and hardware/software characteristics of the user device to implement specific services at the user device using the mobile network. While QoS of the mobile network merely represents quality of network communication regardless of device characteristics, QoE can represent actual expectation of user experience at a user device using the mobile network.

20 Claims, 6 Drawing Sheets

VISUALIZATION OF PERSONALIZED QUALITY OF EXPERIENCE REGARDING MOBILE NETWORK

BACKGROUND

Generally described, computing devices can be used to exchange data via a communication network. In one embodiment, mobile computing devices utilize a wireless communication network provided by a wireless service provider to facilitate the exchange of information in accordance with one or more wireless communication protocols. For example, a wireless service provider can maintain a wireless communication network in which a set of user devices are configured to exchange information in accordance with a second generation wireless communication protocol, such as the Global System for Mobile Communication wireless communication protocol ("GSM"). In another example, the wireless service provider can also maintain another wireless communication network in which user devices are configured to exchange information in accordance with a third generation or fourth generation wireless communication protocol such as the Wideband Code Division Multiple Access ("WCDMA") or Long Term Evolution ("LTE") wireless communication protocols. In the above example, the wireless communication networks of the wireless service provider may or may not share common network components.

Illustratively, a service quality of a wireless communication network can be described based on attributes of communication provided by the wireless communication network or experienced by the user device customer of the wireless service provider. For example, a mobile-based quality of service ("QoS") can include a metric that represents bandwidth of data communication provided by a wireless communication network to one or more user devices. Such a QoS metric can represent the overall service quality of the wireless communication network. However, while a general QoS may represent service quality of a wireless communication network, it may not represent quality of individual user experience using one or more specific services on user devices connected to the wireless communication network.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION

Figure 1:
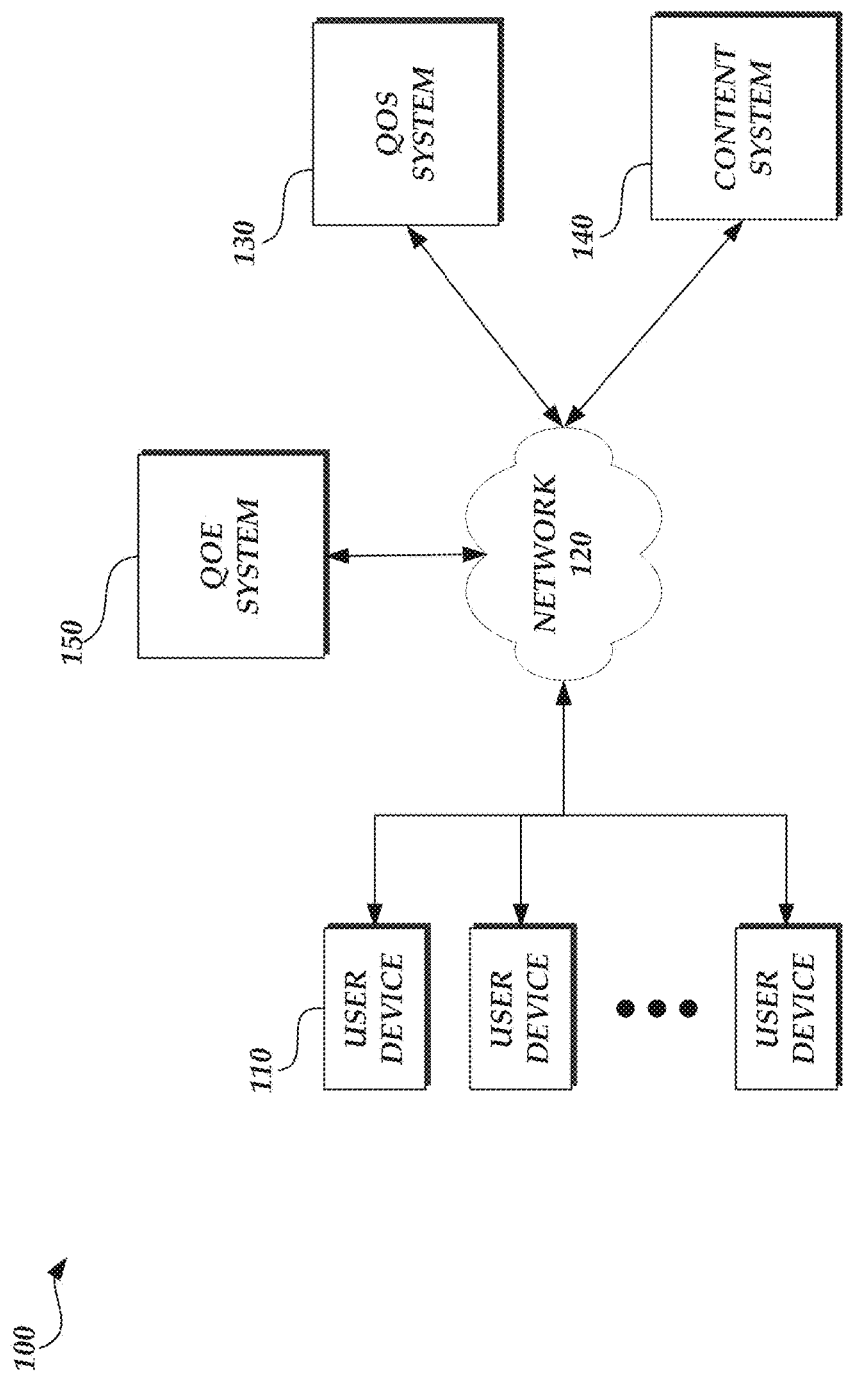
FIG. 1 is a block diagram depicting an operating environment for providing visualization of QoE of mobile service according to an embodiment of the present application.

Generally described, aspects of the present disclosure relate to the management of wireless communication networks. More specifically, aspects of the present application relate to the determination and visualization of a metric that represents expected quality of experience ("QoE") regarding services on identified user devices in a wireless communication network. Illustratively, the QoE metric is measured based on a combination of various attributes of the wireless communication network and user device including, but not limited to, a quality of service ("QoS") metric related to various aspects of the operation of the wireless communication network, characteristics of the resources available on the user device, geographic information, service aspects/requirements, and the like.

In accordance with an aspect of one embodiment, a computer implemented method is provided for determining and generating visualizations of one or more quality of experience metrics related to implementation of an application and access to a service. Generally described, a user device can instantiate software applications or other executable code on the user device. In some embodiments, such software applications or executable code operates in conjunction with server computing devices provided by the wireless service provider. Examples include, but are not limited to, voice application, messaging applications, data application and streaming applications. For example, the wireless service provider can provide external network connectivity that facilitates a user device to access one or more social media content servers that interact with the user device. Such interaction can be generally referred to as accessing a service by the user device.

Accordingly, in one or more aspects, the present application relates to quality of experience metrics related to the access or availability of services via the user device. In accordance with an illustrative embodiment, a QoE method relates to obtaining at least one quality of service metric of the one or more wireless networks based on geographic location information associated with the user device. The method also includes obtaining a characteristic of the user device that represents a resource for the service on the user device and obtaining a specification of the service that. Using the inputted information, the QoE method then includes calculating a QoE metric representing an expected user experience level at the geographic location using on the obtained quality of service, characteristic of the user device, and specification of the service. Illustratively, the QoE metric is distinguished from traditional QoS metric information in that the QoE metric not only incorporates the QoS information, but includes the factoring one or more additional criteria that influence a user perception of interactions, including, but not limited to, the influence of other applications/services, the influence of whether the applications/service is a primary or secondary function on the user device, the influence of how the specific hardware or software configuration of the user device facilitates the implementation of the service, and the like. The QoE metric information can be generated as one of several visualizations that can facilitate display of the QoE metric and elicit additional user interaction.

Specific embodiments and example applications of the present disclosure will now be described with reference to the drawings. These embodiments and example applications are intended to illustrate, and not limit, the present disclosure.

FIG. 1 illustrates an operating environment for visualization of QoE (Quality of Experience) of mobile communication network 100. As illustrated in FIG. 1, the mobile communication network 100 includes multiple user devices 110, one or more quality of experience systems 150, one or more quality of service systems 130 and one or more content generation systems 140. While the user devices 110 are shown as a group within FIG. 1, the user devices 110, individually or as a grouping may be distant (based on geographic location), and independently owned or operated. For example, the user devices 110 could represent a multitude of users in various regional locations accessing a mobile network provided by a mobile service provider. As will be described in detail below, in some embodiments, user devices 110 will be associated with potentially different QoE visualization based on geographic location, such as a different in QoS associated with different geographic regions of a wireless network. In another example, the user devices 110 could represent a grouping of multiple of devices associated with specific users, such as number of computing components associated with various devices.

Network 120 may be any wired network, wireless network, or combination thereof. In addition, the network 120 may be a personal area network, local area network, wide area network, cable network, satellite network, cellular telephone network, or combination thereof. In the example environment of FIG. 1, network 120 is a global area network ("GAN"), such as the Internet. Protocols and components for communicating via the other aforementioned types of communication networks are well known to those skilled in the art of computer communications and thus, need not be described in more detail herein. While each of the user devices 110, quality of service system 130, quality of experience systems 150 and content generation systems 140 are depicted as having a single connection to the network 120, individual components of the user devices 110, quality of service system 130, quality of experience systems 150 and content generation systems 140 may be connected to the network 120 at disparate points. Accordingly, communication times and capabilities may vary between the components of FIG. 1.

User devices 110 may include any number of different computing devices capable of communicating with the other components of the mobile communication network 100. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each user device 110 may optionally include one or more data stores (not shown in FIG. 1) including various applications or computer-executable instructions, such as web browsers, used to implement the embodiments disclosed herein. On an individual basis, user device 110 may generally have access to fewer computing resources (e.g., processing power, memory, persistent storage space, electronic power, network communication capabilities, etc.) than the mobile communication network 100. Illustrative components of a user device 110 will be described with regard to FIG. 2.

In accordance with embodiments, the quality of service system 130, quality of experience systems 150 and content generation systems 140 can include, individual or in combination, one or more servers for implementing services or functions described herein. Illustrative components of a quality of service system 130 will be described with regard to FIG. 3. Illustrative components of a quality of experience system 150 will be described with regard to FIG. 4.

It will be appreciated by those skilled in the art that the mobile communication network 100 may have fewer or greater components than are illustrated in FIG. 1. Thus, the depiction of the mobile communication network 100 in FIG. 1 should be taken as illustrative. For example, in some embodiments, components of the mobile communication network 100, such quality of service system 130, quality of experience systems 150 and content generation systems 140, may be executed by one more virtual machines implemented in a hosted computing environment. A hosted computing environment may include one or more rapidly provisioned and released computing resources, which computing resources may include computing, networking or storage devices.

Figure 2:
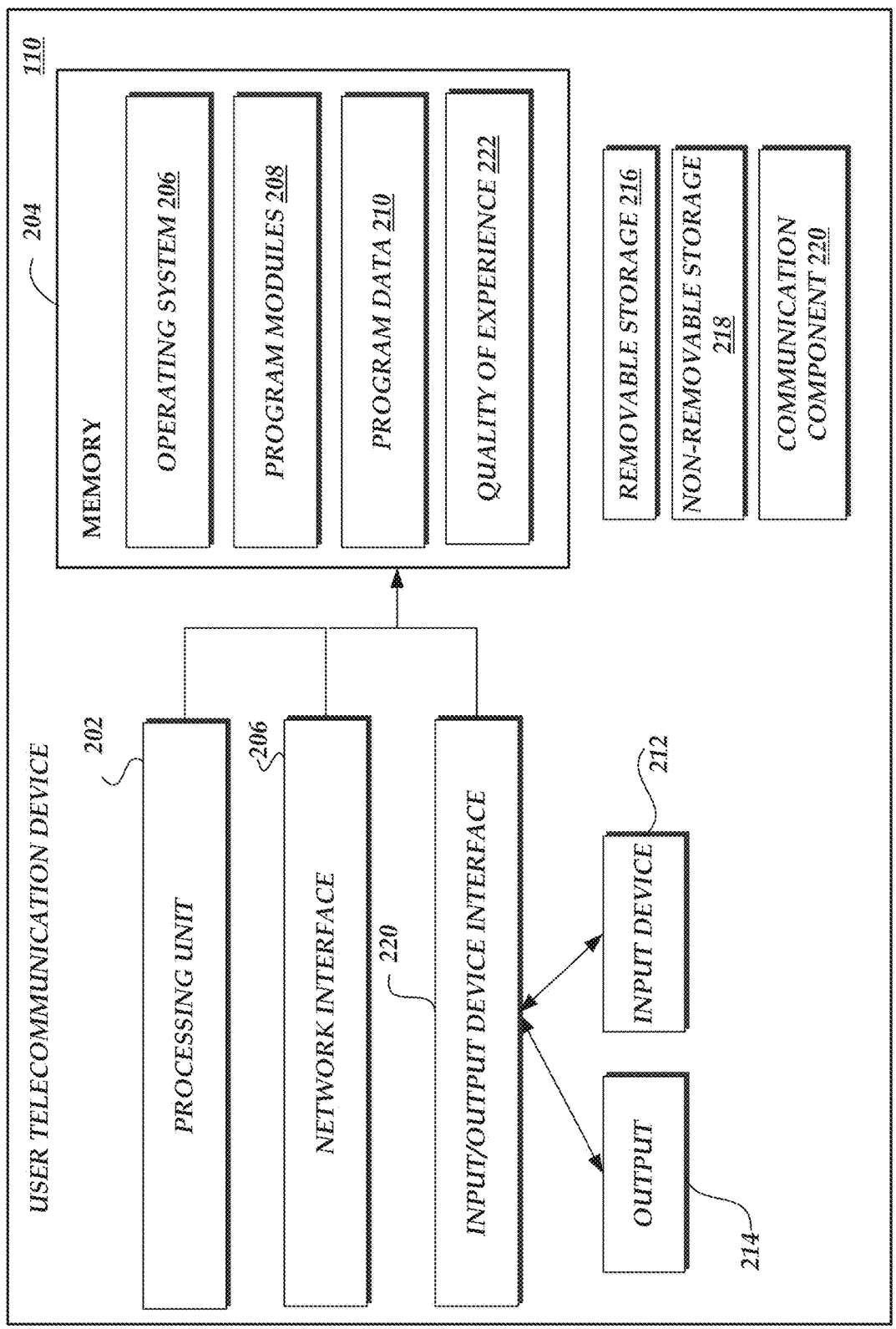
FIG. 2 is a block diagram illustrative of a mobile computing device according to an embodiment of the present application.

With reference now to FIG. 2, illustrative components of a user device, such as user device 110 or any mobile device that can access a wireless network, for use in the creation and display of group-based information displays will be described. The user device 110 may include one or more processing units 202, such as one or more CPUs. The user device 110 may also include system memory 204, which may correspond to any combination of volatile and/or non-volatile storage mechanisms. The system memory 204 may store information which provides an operating system component 206, various program components 208, program data 210, a quality of experience component 222 or other components.

The above-enumerated list of components is representative and is not exhaustive of the types of functions performed, or components implemented, by the user device 110. One skilled in the relevant art will appreciate that additional or alternative components may also be included in the user device 110 to carry out other intended functions such as a mobile telephone functions.

Figure 5:
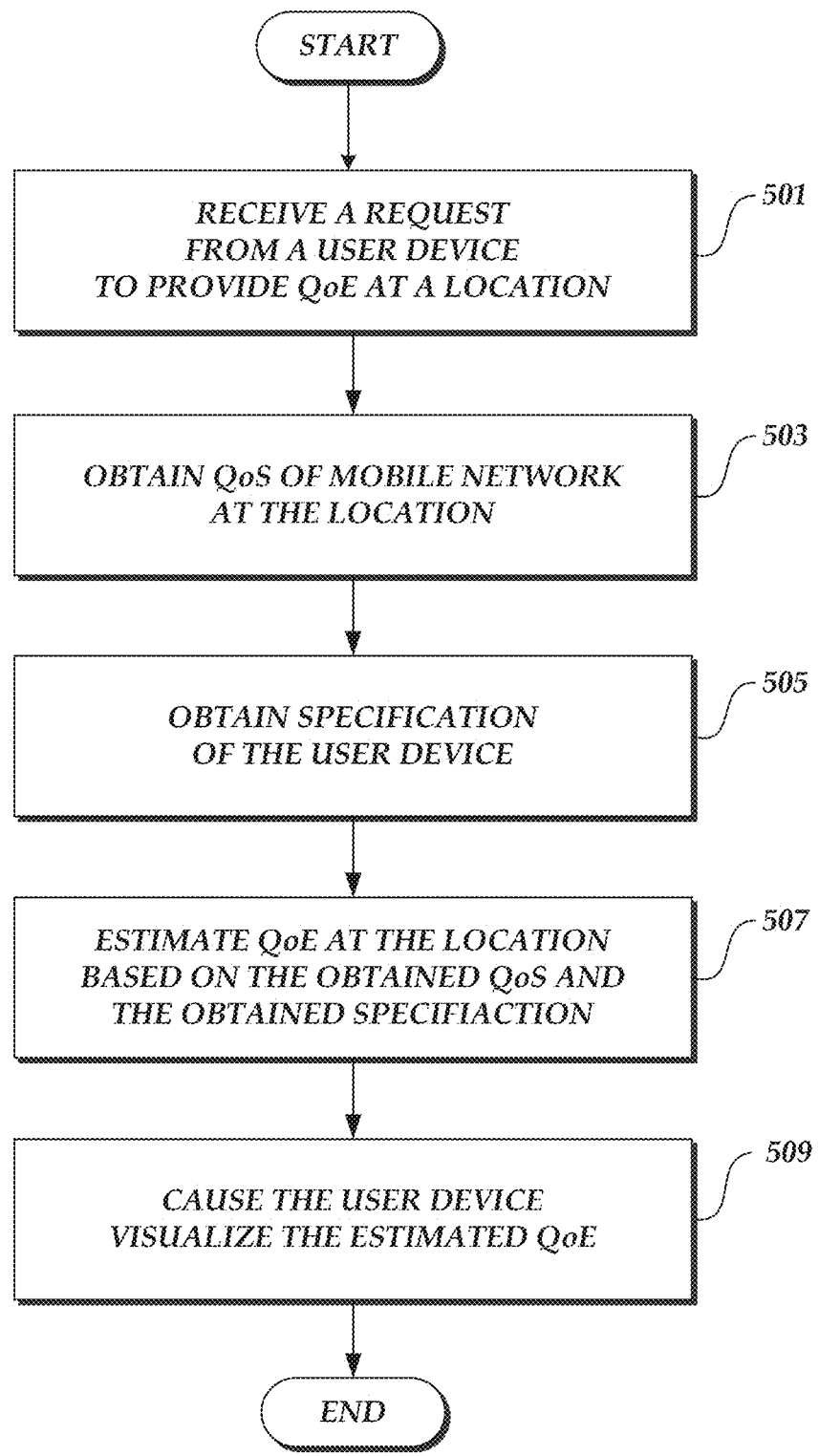
FIG. 5 is a flow diagram for providing visualization of QoE of mobile service according to an embodiment of the present application.

The user device 110 performs functions by using the processing unit(s) 202 to execute instructions provided by the system memory 204. The user device 112 may also include one or more input devices 212 (keyboard, mouse device, specialized selection keys, etc.) and one or more output devices 214 (displays, printers, audio output mechanisms, etc.). Illustrative user interfaces for a user device 112 will be described with regard to FIG. 5, described below.

With continued reference to FIG. 2, the user device 110 may also include one or more types of removable storage 216 and one or more types of non-removable storage 218. Still further, the user device 112 can include communication components 220 for facilitating communication via wired and wireless communication networks, such as the communication network 120 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

Figure 3:
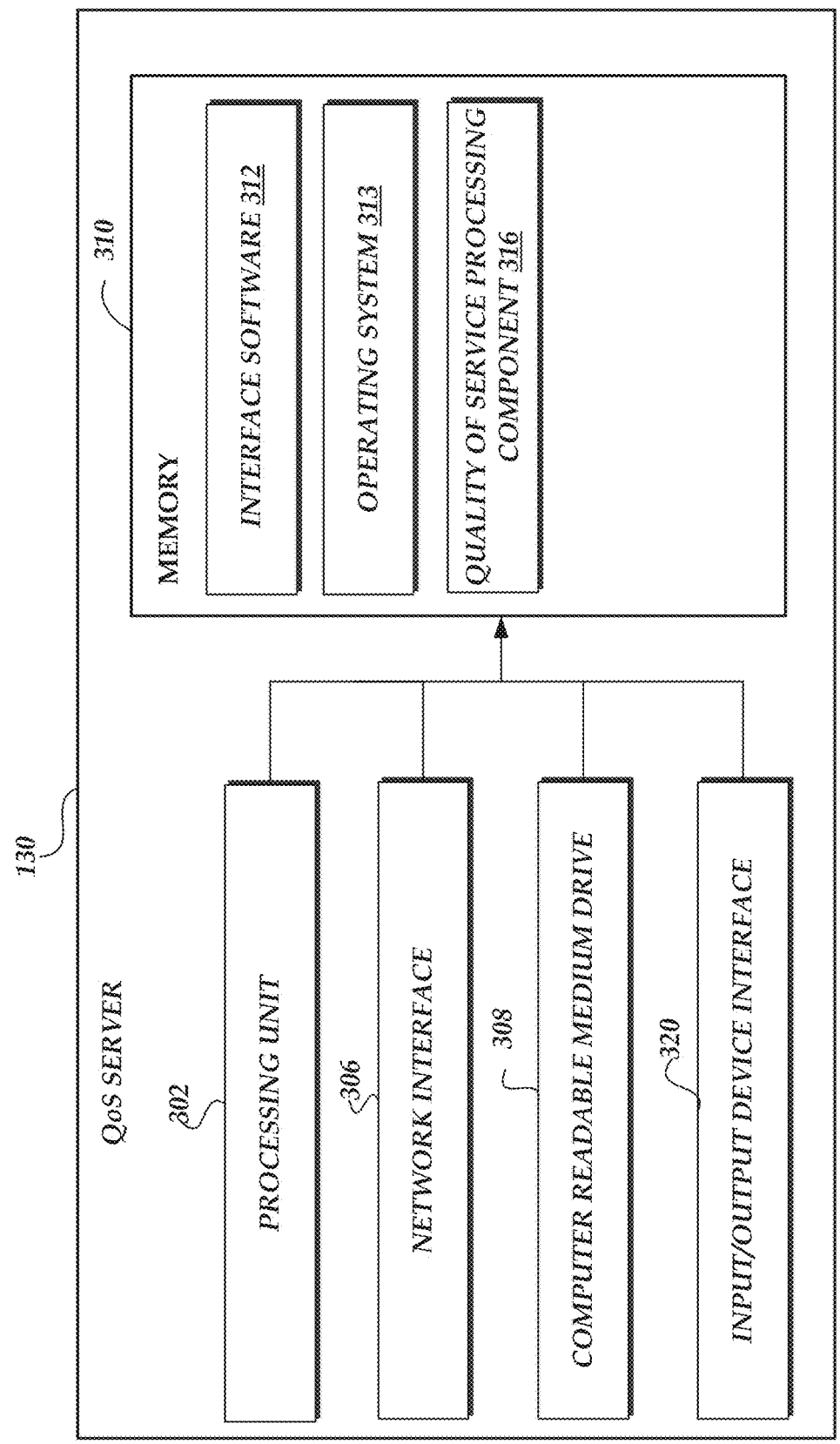
FIG. 3 is a block diagram illustrative of a QoS system according to an embodiment of the present application.

FIG. 3 illustrates illustrative components of a QoS server 130 according to an embodiment of the present application. The general architecture of the QoS server 130 depicted in FIG. 3 includes an arrangement of computer hardware and software components that may be used to implement aspects of the present disclosure. As illustrated, the QoS server 130 includes a processing unit 304, a network interface 306, a computer readable medium drive 307, an input/output device interface 320 which can interface with a plurality of peripheral devices, such as optional output devices (e.g., displays, speakers, etc.), and an optional input devices (e.g., touchscreens, keypad, keyboards, buttons, etc.), all of which may communicate with one another by way of a communication bus.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information The memory 310 may include computer program instructions that the processing unit 304 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the client 103. The memory 310 may further include computer program instructions and other information for implementing aspects of the present disclosure. For example, in one embodiment, the memory 310 includes a quality of service processing application 316 for processing quality of service information and transmitting the quality of service information to the quality of experience server 150.

Figure 4:
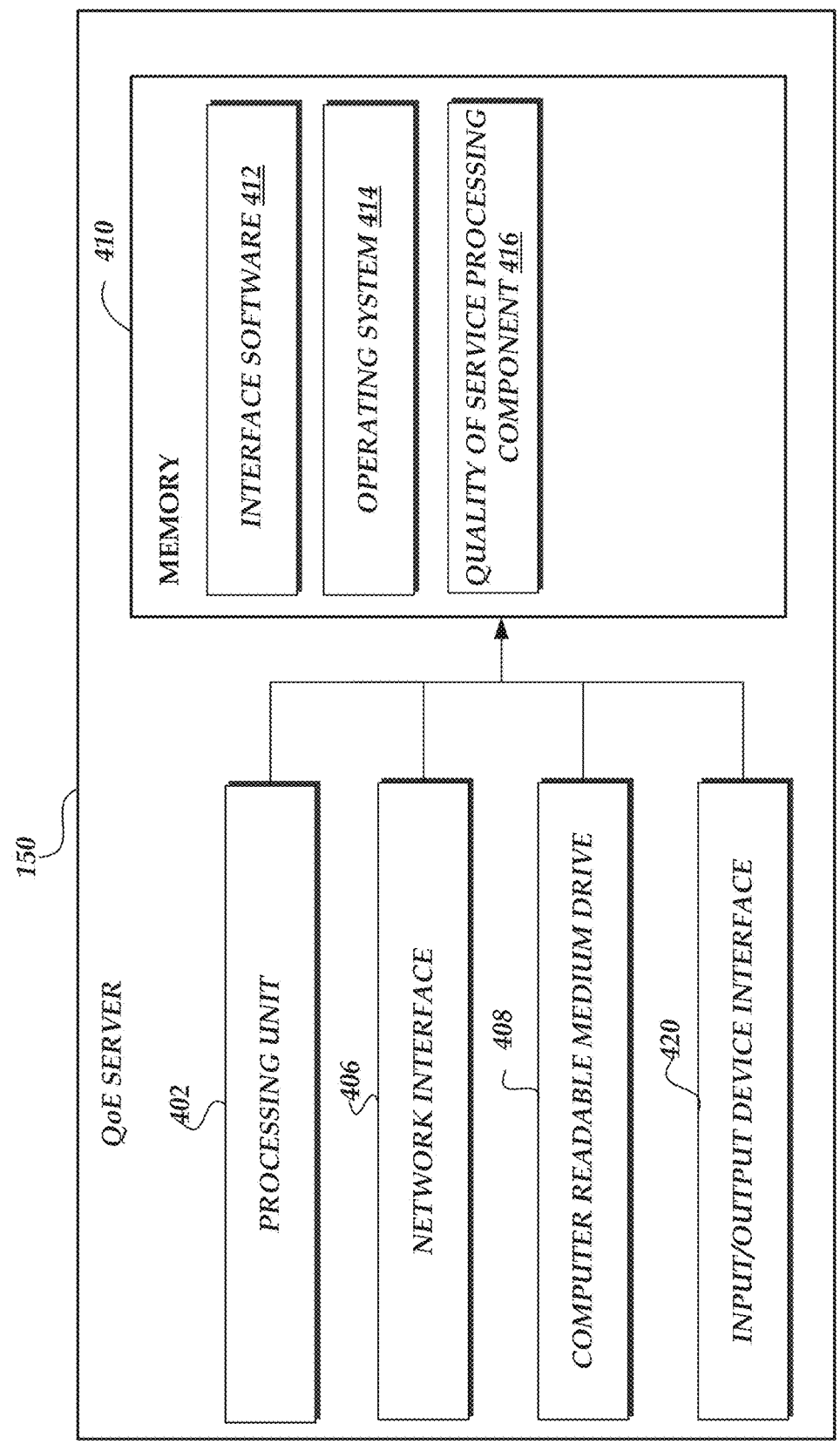
FIG. 4 is a block diagram illustrative of a QoE system according to an embodiment of the present application.

FIG. 4 illustrates illustrative components of a QoE (Quality of Experience) server 150 according to an embodiment of the present application. The general architecture of the QoE server 150 depicted in FIG. 4 includes an arrangement of computer hardware and software components that may be used to implement aspects of the present disclosure. As illustrated, the client device 104 includes a processing unit 402, a network interface 406, a computer readable medium drive 408, an input/output device interface 420, which can interface with a plurality of peripheral devices, such as optional output devices (e.g., displays, speakers, etc.), and an optional input devices (e.g., touchscreens, keypad, keyboards, buttons, etc.), all of which may communicate with one another by way of a communication bus.

The network interface 406 may provide connectivity to one or more networks or computing systems, such as the network 120 of FIG. 1. The processing unit 404 may thus receive information and instructions from other computing systems or services via a network. The processing unit 404 may also communicate to and from memory 410 and further provide output information.

The memory 410 may include computer program instructions that the processing unit 404 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the client 104. The memory 410 may further include computer program instructions and other information for implementing aspects of the present disclosure. For example, in one embodiment, the memory 410 includes a quality of service processing application 416 for processing quality of service information and a user metric collecting component for obtaining user metric information from a plurality of user devices 110. The memory 410 may further include a quality of experience component 440 for calculating a characteristic of the quality of experience for a set of user device users, as will be described below With reference now to FIG. 5, a routine 500 will be described. Illustratively, routine 500 will be implemented by a QoE server 150 or other component implementing similar functionality. At block 501, the QoE server 150 obtains a request from a user device 110 to provide QoE information. Illustratively, the QoE request received from the user device 110 may include information identifying the user device 110, such as client identifiers, mobile account identifiers, and the like. Additionally, the QoE request can include location information identifying a location for the user devices, such as GPS coordinates, mobile infrastructure identifier information (e.g., eNode B or base stations in range) or other identification information. Additionally, the user device 110 can also obtain location information, such as via near field communications with a component that can provide, at least partially, location information.

Illustratively, the QoE request transmitted by the user device 110 can be transmitted automatically by the user device 110 based on a configuration implemented by the user device 110, such as based on a determination that the user device 110 is determined to be in a particular location, based on the user accessing specific types of data or applications, or based on determining one or more environmental factors. For example, a user may configure the user device 110 to automatically send a QoE request based on a measurement of radio signal strength. In another example, a user may configure the user device 110 to automatically send a QoE request based arriving in a location or geographic region. In still a further example, a user may configure the user device 110 to send a QoE request responsive to selection of a particular application or software component, such as video component, to allow the user to determine QoE prior to using the selected application. In still another example, the user device 110 may be configured to automatically send a QoE request based on time of day criteria (e.g., within a defined time window). In still a further example, the user device 110 may be configured to automatically send a QoE request based on specific login credential or other account identifiers that correspond to specific customers, customer account, or types of uses (e.g., a business use vs. a personal use).

At block 503, the QoE server 150 obtains QoS information from the QoS server 130. Illustratively, the QoE server 150 can utilize an API to request QoS information from the QoS server 130. In some embodiments, the QoS information request can specify the type of information requested from the QoS server 130. In other embodiments, the API request can correspond to an established template or format for the QoS information and does not need to be specified within the QoE request. Generally described, QoS information can include characteristics of network performance including available or effective bandwidth that measures the rate at which traffic is carried by the network, latency which measures delays in transmitting data from a source to a destination, jitter which measures variations in latency and reliability which measure the amount of data that is lost or determined to be incomplete during transmission. In some embodiments, the QoS information can be characterized into predefined categories based on mapping measured information, such as excellent, good, bad, etc. In other embodiments, the QoS information can be characterized into scores that can be compared to thresholds or ranges of QoS. For example, the QoS server 10 can process measured information and approximate the measured information into a grading scale (e.g., 0-100) or range of values (e.g., 1-10) that facilitate comparison or further processing. As will be described in greater detail below, in some embodiments, QoS information provided in numerical form can be used by the QoE server 150 to generate QoE metric information.

In addition to the different forms of QoS information as exemplified above, QoS information can also be associated with location information. In one example, the QoS information can be attributed to different infrastructure equipment location, such as eNode B's. In another example, the QoS information can be defined by geographic boundaries (e.g., established geographic zones), such that any location within a defined geographic boundary would be attributed with QoS information for the geographic information. Illustratively, the location information associated with the QoS information would match or otherwise be relatable to the location information with the QoE request transmitted by user device 110. Additionally, in some embodiments the QoS information associated with geographic boundaries can be based on the measured experienced by at least one other user. For example, the QoS information can be based on historical information for a group of users with similar user devices. In this embodiment, the QoS server 130 can generate statistical information regarding the QoS information based on historical information, such as average values, normalized values and the like. Additionally, in other aspect, the QoS server 130 can utilize various weighting algorithms to determine QoS information. In one example, the QoS server 130 can associate weight values to the QoS information based on time of experience in which more recent QoS information is weighed more heavily. In another example, the QoS server 130 can associate weight values based on proximity to the geographic location such that QoS information from the devices most proximate to the user device is weighed more heavily. In still another example, the QoS server 130 can associate weight values based on association to the user device 110, such that QoS information other devices considered to be most similar to the user device (based on model, use profiles, etc.) is weighed more heavily. One skilled in the relevant art will appreciate that additional or alternative factoring could also be utilized. Additionally, in some embodiments, although the further processing of the QoS information is described as being performed by the QoS server 130, the QoE server 150 can implement some or all of the additional processing of the QoS information.

At block 505, the QoE server 150 obtains specification of the operation of user device and other operational information. In one aspect, the specification information can include a type of user device (e.g., manufacturer and model), a type of components (e.g., specification of RF chipset, processing components, memory devices, etc.), operating environments, and software applications. The specification of user device and other operational information can also include utilization information for various components, such as the current or historical utilization of processing resources, input/output timing information (e.g., data throughput estimates, dropped data packet counts, etc.), memory utilization and fragmentation, processing resource utilization, and the like.

In another aspect, the specification of user device 110 and other operational information includes a current and historical determination of how the specific user device is being utilized. For example, the user device 110 and other operational information can include an identification of whether the user device is being utilized for voice, data for other software application, or streaming functionality. Such information can be provided in the form of selection of categories of use or specification details of the types of use. Based on the information, the QoE server 150 can maintain a matrix of the types of use for the user device 110, which be further characterized as explained below.

Additionally, for each type of identified utilization (such as organized by application), the user device 110 and other operational information can include a characterization of utilization, such as a primary function vs. a secondary function or an approximated measure of utilization, such as light usage, medium usage, heavy usage, and the like. In still other embodiments, the user device 110 and other operational information can include a measure of the usage, such as time to complete a standard function, an identification of any error rates or faults that were experienced or detected. The operational information can also include an input from the user regarding a perceived operation of the device and applications. For example, a user can presented with buttons or controls that indicate their perception of the operation of the device or specific operation. In another example, the user device 110 may be configured to receive audio input to capture immediate user feedback regarding perceptions of how the user device 110 or other applications are operating.

At block 507, the QoE server 150 calculates an estimate of one or more quality of experience (QoE) factors based on the processing of the obtained quality of service information and the specification of the operation of user device and other operational information. Illustratively, the QoE factors correspond to a correlation or quantification of a type of interaction that the current user is likely to experience. In one aspect, the QoE factors are based, at least in part, on the QoS factors, such as signal strength for wireless communication, current measured data throughput, historical measured data throughput, and the like. In this regard, the QoS factors are generally independent on the type of interaction by the user device and review of the QoS factors by themselves do not provide an indication of the type of performance of the user device 110 in accessing specific services or distinguishing between accessing different types of service (e.g., applications) on the user device 110. Accordingly, in a second aspect, the QoE factors are based at least in part on determining how the specification of the user device 110 will correspond to the current QoS factors. Illustratively, the QoE factors may be specified according to predefined categories, such as "Good" "Great" or "Limited." The QoE factors may be associated with a numerical range (e.g., 1 to 100) that can then further be associated with a grading schema (e.g., "A", "B", "C," "D", etc.). In still other examples, the QoE factors may be specified by a summation of the influence of specific QoS information to the specification. In this example, each QoS factor can add (or subtract) a number (e.g., 1 to 10). The resulting QoE factor corresponds to a summed number that can be displayed or characterize or further processed or normalized. The influence of the QoS factors can further be individually weighted such that some QoS factors would have a greater influence on different types of service specifications. For example, the QoS factor for data throughput would have a greater weight for video streaming than for messaging or voice calling. Similarly, the QoS factor for dropped data packets may have a greater weight for voice calling than for messaging, equal weight for video streaming, and no weight for local application execution.

Illustratively, the QoE factors can correspond to a matrix, business rules or decision logic that can correlate individual specifications with different QoS information and other application information on the user device. For each correlation, the result can be in the form of a QoE specification. By way of illustrative example, a user device 110 specification can correspond to a utilization of the user device 110 for voice calling, textual messaging, data packet exchanges, video streaming. As previously described, each of these specifications can be further characterized as being primary functions or secondary seconds or by specifying the current type of use (e.g., heavy usage of video streaming when a movie application is running as a primary function). For at least some, if not all, of the specification, a QoE factor can be designated for individual QoS factors or combination of QoS factors. With continued reference to the illustrative example, assume the current QoS factors include an assessment of good signal strength of and limited data throughput due to network congestion. The correlated QoE factor for messaging may be considered "Great" since the signal strength is high and the limited data throughput may not effect messaging. In contrast, the correlated QoE factor for video streaming may be considered "Bad" since the limited data throughput. In this example, the cumulative QoE factor could be the lowest categorization for any QoS factor (e.g., the cumulative QoE is adopted as the worse individual factor from any QoS factor).

As previous described above, with reference to another example, the cumulative QoE factor for a specification can correspond to a sum of the individual QoS factors. Illustratively, the QoE server 150 can include a matrix of sub-scores that attributes a number value for specified QoS factors or that adopts the numerical value attributed to the QoS factors, as described above. Accordingly, QoE for user device specification(s) can be based on a formulaic calculation based on received inputs for QoS factors. The formulaic calculation can be weighted and can include default values for QoS factors that are not received. Additionally, in some embodiments, the QoS factor inputs may include not only QoS values for a current point in time but can also incorporate historical QoS factors. For example, a QoS value for signal strength can correspond to weighted average of signal strength including the more current signal strength value (weighed the heaviest) but also including other historical values with diminishing weighed values. In further embodiments, the QoE server 150 can incorporate feedback provided by the user device 110 on previous displays on QoE information to adjust weighed values or the formula itself. In one example, if the QoE server 150 indicated that the QoE factor was "Good", receiving user input that the experience from the user at that time was not in agreement can cause the QoE server 150 to adjust the formula or how inputs are processed. Still further, the QoE server 150 can also include additional adjustments based on current utilization of the user device 110. For example, the QoE server 150 can be configured with a correlation matrix in which the performance of specific application (or services) can be considered to be diminished based on utilization of additional services (primary or secondary). In this example, the QoE server 150 can be configured with weights or other adjustment factors that would cause the QoE metric to be adjusted. By way of illustration, if the QoE server 150 is associating a QoE metric to a data streaming application, the QoE server can correlate an adjustment if another data intensive service/application is currently a secondary function.

Illustratively, the QoE server 150 can maintain one or more profiles that facilitate that determination of QoE factor calculations. The QoE server 150 profiles may include a default profile that is applicable to all users, one or more profiles that correspond to different user devices or types of user devices, one or more profiles that correspond to specific individuals or individual accounts, and the like. Accordingly, as part of the estimation of the QoE factors can include making a selection of one or more profiles to utilize in the calculation of the QoE factors.

At block 509, the QoE server 150 can cause the user device 110 to visualize the estimate QoE factors. Illustratively, the QoE server 150 can utilize the same API utilized by the user device 110 to request the QoE factor information and the resulting information for visualization can be considered responsive to the request. In one embodiment, the QoE server 150 can transmit the QoE factor information by itself for processing the user device 110 into interfaces or visualizations. In other embodiments, the QoE server 150 can at least partially generate aspect of the visual display objects that will be rendered on the user device 110.

Illustratively, the visualization of the QoE factors can include, but is not limited to, graphic objects that identify one or more of the categories of QoE factors. For example, one or more specifications (e.g., text messaging, voice calls, etc.) may be displayed on the screen alongside a graphical object indicative of the category of QoE factor (e.g., "Good", etc.). In another example, a numerical value for individual QoE factors may also be displayed or available for display to provide more detailed information regarding the QoE factor. Additional visual display object, such as color coded borders or text, special characters, sounds, tactile feedback, and the like may be utilized for specific results of QoE factor information, such as a determination that any QoE factor may be considered "Bad" or below a threshold amount (if a numerical calculation is utilized).

Figure 6:
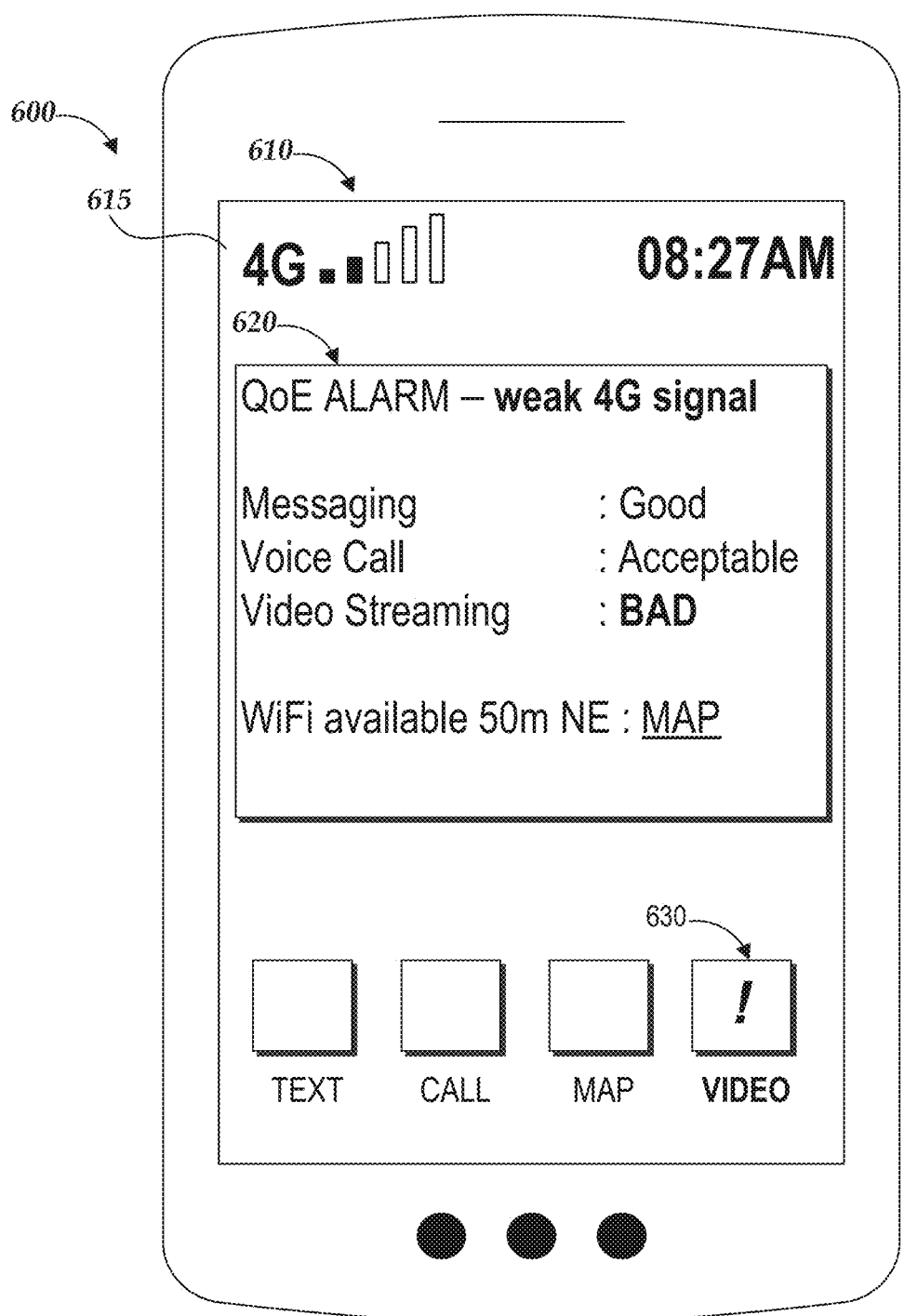
FIG. 6 is a diagram illustrative of a visual indication of QoE on user device according to an embodiment of the present application.

FIG. 6 is a block diagram 600 illustrative a screen display 610 generated on a user device 110. As illustrated in FIG. 6, the screen display 610 includes a first portion 615 that displays QoS factor information, such as signal strength, dropped packets, data throughput, and the like. Illustratively, users may still be presented with QoS information and QoE information in a user display. The screen display 610 also includes a second portion 620 that corresponds to one or more QoE factors. As illustrated in FIG. 6, one or more specifications (e.g., text messaging, voice calls, and video streaming) may be displayed on the screen alongside a graphical object indicative of the category of QoE factor (e.g., "Good", "Acceptable" and "BAD"). As previously described, the visual display objects can incorporate color coded borders or text or special characters that assist in relaying the determined QoE factor information. The illustrative screen display 610 can further include a third portion 630 that defines alert conditions for one or more specifications (e.g., text messaging, voice calls, etc.) and which may also function as controls for accessing the specification. In this regard, a special character, visual alerts or audible alerts may accompany the display objects so that a user is presented with relevant QoE factor information as part of the attempting to access the specified function/service. One skilled in the relevant art will appreciate that the visual display 610 is only illustrative in nature and that alternative displays or a sequence of displays may be incorporated.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored assume in a computer-readable medium and loaded into memory of the computing device using a drive mechanism associated with a computer readable storage medium storing the computer executable components such as a CD ROM, DVD ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method to provide a quality of experience metric corresponding to a user device on a wireless network, the method comprising:
   as implemented by a computing system having one or more processors and a memory, the computing system configured with specific computer-executable instructions for:
      obtaining at least one quality of service metric of the wireless network, wherein the quality of service metric is at least partly based on a quality of service metric measured previously by at least one other user device, and wherein the quality of service metric is associated with a geographic location;
      obtaining a characteristic of the user device, wherein the characteristic comprises at least one attribute that represents an available resource for a service on the user device;
      obtaining a specification of the service, wherein the specification of the service comprises an identification of one or more operational aspects of the user device and a characterization of a current utilization of the user device;
      calculating a user experience metric corresponding to a quantification of the at least one quality of service metric, the characteristic of the user device, and the specification of the service, wherein the user experience metric indicates an expected user experience of the service on the user device at the geographic location; and
      causing the user device to provide a visual indication of the calculated user experience metric on the user device.

2. The method as recited in claim 1, wherein causing the user device to provide the visual indication of the calculated user experience metric includes causing the user device to display an indicator of the calculated user experience metric on a map corresponding to the geographic location.

3. The method as recited in claim 1, wherein the characterization of the current utilization of the user device is based on a selection of one of a set of possible pre-defined characterizations.

4. The method as recited in claim 1 further comprising causing the user device to display information corresponding to additional user experience metrics that may be available.

5. An system for managing a user device based on quality of experience metrics associated with a communication network comprising:
   a computing device comprising a processor coupled to a memory, the memory including specific instructions that upon execution configure the computing device to:
      obtain at least one quality of service metric of the communication network for a service provided at a geographic location encompassed by the communication network, wherein the quality of service metric is at least partly based on historical quality of service metrics for at least one other user device at the geographic location;
      obtain a specification of the service, wherein the specification of the service comprises information regarding operation of the user device;
      using a quantification of the obtained at least one quality of service metric and a quantification of the obtained specification of the service, calculate a quality of experience metric characterizing an expected user experience of the service at the geographic location; and
      cause the user device to provide a visual indication of the calculated quality of experience metric on the user device.

6. The system as recited in claim 5, wherein the computing device causes the user device to provide the visual indication of the calculated quality of experience metric by causing the user device to display an indicator of the calculated quality of experience on a map corresponding to the geographic location.

7. The system as recited in claim 5, wherein the computing device obtains the specification of the service by obtaining a characterization of utilization.

8. The system as recited in claim 7, wherein the characterization of utilization includes an association of the service based on a set of pre-defined characterizations.

9. The system as recited in claim 5, wherein causing the user device to provide a visual indication comprises causing the user device to modify an icon corresponding to an application accessible to a user of the user device.

10. The system as recited in claim 9, wherein the user device generates an additional control related to a change of service level.

11. The system as recited in claim 5, wherein the communication network corresponds to a wireless communication network and wherein the geographic location corresponds to a defined subset of the wireless communication network.

12. The system as recited in claim 5, wherein the at least one quality of service metric includes at least one of measured software characteristics or measured hardware characteristics.

13. The system as recited in claim 5, wherein the at least one quality of service metric is at least partly based on historical quality of service metrics measured by a plurality of user devices at the geographic location.

14. A non-transitory, computer-readable storage medium storing computer-executable instructions that, when executed by a computer system, configure the computer system to perform operations corresponding to a management of a user device associated with wireless networks using quality of experience characteristics comprising:
- obtaining at least one quality of service metric of a wireless network, wherein the quality of service metric is at least partly based on historical quality of service metrics obtained from one or more other user devices and associated with a geographic location encompassed by the wireless network;
- obtaining a characteristic of the user device, wherein the characteristic comprises at least one metric that represents at least one available resource utilized in accessing the service from the user device;
- using a quantification of the obtained at least one quality of service metric and a quantification of the characteristic of the user device, calculating a quality of experience metric representing expected user experience of the service on the user device at the geographic location; and
- causing the user device to provide a visual indication of the calculated quality of experience metric on the user device.

15. The non-transitory, computer-readable storage medium as recited in claim 14, wherein causing the user device to provide the visual indication of the calculated quality of experience metric includes causing the user device to display an indicator of the calculated quality of experience metric on a map corresponding to the geographic location.

16. The non-transitory, computer-readable storage medium as recited in claim 14, wherein obtaining the characteristic of the user device includes obtaining user input corresponding to a perception of performance of the user device.

17. The non-transitory, computer-readable storage medium as recited in claim 16, wherein obtaining user input corresponding to a perception of performance of the user device includes obtaining a user characterization of the perception of performance based on audio information generated by a user.

18. The non-transitory, computer-readable storage medium as recited in claim 14 further comprising causing the user device to display information corresponding to additional user experience metrics that may be available.

19. The non-transitory, computer-readable storage medium as recited in claim 14, wherein causing the user device to provide a visual indication of the calculated quality of experience metric includes causing the user device to modify an icon corresponding to an application accessible to a user of the user device.

20. The non-transitory, computer-readable storage medium as recited in claim 14, wherein causing the user device to provide a visual indication of the calculated quality of experience metric includes causing the user device to generate a promotion for an additional service.

* * * * *